United States Patent
Yang et al.

(10) Patent No.: US 12,014,251 B2
(45) Date of Patent: *Jun. 18, 2024

(54) METHOD FOR PROCESSING INFORMATION BY INTELLIGENT AGENT AND INTELLIGENT AGENT

(71) Applicant: HUAWEI TECHNOLOGIES CO., LTD., Guangdong (CN)

(72) Inventors: Qiang Yang, Shenzhen (CN); Yangqiu Song, Morgantown, WV (US); Wing Ki Leung, Shenzhen (CN); Zhengdong Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,231

(22) Filed: Dec. 13, 2021

(65) Prior Publication Data

US 2022/0172121 A1     Jun. 2, 2022

Related U.S. Application Data

(63) Continuation of application No. 15/196,932, filed on Jun. 29, 2016, now Pat. No. 11,200,509, which is a
(Continued)

(30) Foreign Application Priority Data

Dec. 30, 2013     (CN) .......................... 201310749685.5

(51) Int. Cl.
 *G06N 5/022*     (2023.01)
 *G06F 16/2458*   (2019.01)
(Continued)

(52) U.S. Cl.
 CPC ......... *G06N 20/00* (2019.01); *G06F 16/2465* (2019.01); *G06N 5/022* (2013.01); *G06N 5/043* (2013.01)

(58) Field of Classification Search
 CPC ........ G06N 20/00; G06N 5/022; G06N 5/043; G06F 16/2465
(Continued)

(56) References Cited

U.S. PATENT DOCUMENTS 6,691,151 B1 * 2/2004 Cheyer ............... G06F 16/3334
                                                707/E17.139
9,691,107 B2     6/2017 Lyren
(Continued)

FOREIGN PATENT DOCUMENTS

CN     102955948     3/2013
CN     103399891     11/2013
(Continued)

*Primary Examiner* — Tsu-Chang Lee
(74) *Attorney, Agent, or Firm* — Fish & Richardson P.C.

(57) ABSTRACT

A method for processing information by an intelligent agent and the intelligent agent, where the method comprises: a first intelligent agent sends a request message to a second intelligent agent, where the request message includes an invitation message or a recommendation message; the first intelligent agent receives a decision message fed back by the second intelligent agent, where the decision message is determined according to the invitation message or the recommendation message and a knowledge model of the second intelligent agent; and the first intelligent agent updates, according to the decision message, a knowledge model of the first intelligent agent or sends a notification message to a first user account corresponding to the first intelligent agent. By using these technical solutions, information on a social network may be learned and processed by means of
(Continued)

interaction with another intelligent agent, thereby implementing mining of data on the social network.

12 Claims, 6 Drawing Sheets

Related U.S. Application Data continuation of application No. PCT/CN2014/081536, filed on Jul. 3, 2014.

(51) Int. Cl.
*G06N 5/043* (2023.01)
*G06N 20/00* (2019.01)

(58) Field of Classification Search
USPC .......................................................... 706/12
See application file for complete search history.

(56) References Cited

U.S. PATENT DOCUMENTS

| | | |
|---|---|---|
| 2006/0167917 A1 | 7/2006 | Solomon |
| 2011/0314382 A1 | 12/2011 | Sweeney |
| 2013/0124437 A1 | 5/2013 | Pennacchiotti et al. |
| 2013/0191394 A1 | 7/2013 | Bradley et al. |
| 2013/0346876 A1* | 12/2013 | Yerli ................ G06Q 30/0201 |
| | | 715/753 |
| 2014/0074606 A1 | 3/2014 | Graham et al. |
| 2014/0081636 A1* | 3/2014 | Erhart ................ G10L 15/065 |
| | | 704/236 |

FOREIGN PATENT DOCUMENTS

| | | |
|---|---|---|
| CN | 103412936 | 11/2013 |
| CN | 103475632 | 12/2013 |
| WO | 2013014011 | 1/2013 |

* cited by examiner

METHOD FOR PROCESSING INFORMATION BY INTELLIGENT AGENT AND INTELLIGENT AGENT

CROSS-REFERENCE TO RELATED APPLICATIONS

This application is a continuation of U.S. patent application Ser. No. 15/196,932, filed on Jun. 29, 2016, now U.S. Pat. No. 11,200,509, which is a continuation of International Application No. PCT/CN2014/081536, filed on Jul. 3, 2014. The International Application claims priority to Chinese Patent Application No. 201310749685.5, filed on Dec. 30, 2013. All of the afore-mentioned patent applications are hereby incorporated by reference in their entireties.

TECHNICAL FIELD

The present invention relates to the field of Internet technologies, and in particular, to a method for processing information by an intelligent agent and the intelligent agent.

BACKGROUND

A social network has become an increasingly significant part of the Internet. Information mining and analysis on the social network has become a significant direction. In the prior art, data based on a hypothesis of independence and identical distribution may be learned and processed by using a classification or clustering method. Independence and identical distribution refers to that a variable sequence or other collection of random variables has the same probability distribution and that variables are mutually independent, that is, a value of a variable is not affected by a value of another variable. The classification method refers to that a group of annotated samples are first trained to obtain a classifier, and then, unannotated samples are input into the classifier during a test, so that sample labels may be output from the unannotated samples. The clustering method refers to input of a group of unannotated samples and output of clustering labels of the samples.

However, when information on a social network is processed by using the prior art, because a classification or clustering method is used for processing independent and identically distributed data, and the information on the social network generally has a personalized feature, it is improper to process the information on the social network by using a conventional classification or clustering method; therefore, mining of data on the social network cannot be implemented.

SUMMARY

Embodiments of the present invention provide a method for processing information by an intelligent agent and the intelligent agent, where information on a social network may be learned and processed by means of interaction with another intelligent agent, thereby implementing mining of data on the social network.

According to a first aspect, the present invention provides a method for processing information by an intelligent agent, including: sending, by a first intelligent agent, a request message to a second intelligent agent, where the request message includes an invitation message or a recommendation message sent to the second intelligent agent; receiving, by the first intelligent agent, a decision message fed back by the second intelligent agent, where the decision message is a message that is determined by the second intelligent agent according to the invitation message or the recommendation message and a knowledge model of the second intelligent agent; and updating, by the first intelligent agent according to the decision message, a knowledge model of the first intelligent agent or sending, by the first intelligent agent according to the decision message, a notification message to a first user account corresponding to the first intelligent agent.

In a first possible embodiment, with reference to the first aspect, the sending, by a first intelligent agent, a request message to a second intelligent agent includes: sending, by the first intelligent agent, the request message to the second intelligent agent at any moment; or predicting, by the first intelligent agent, an idle time of a second user account by learning a historical posting time of the second user account, and sending, by the first intelligent agent, the request message to the second intelligent agent at the idle time of the second user account, where the second user account corresponds to the second intelligent agent.

In a second possible embodiment, with reference to the first aspect, the sending, by a first intelligent agent, a request message to a second intelligent agent includes: determining, by the first intelligent agent, that an object to which the invitation message or the recommendation message is to be sent is the second intelligent agent; and sending the invitation message or the recommendation message to the second intelligent agent.

In a third possible embodiment, with reference to the second possible embodiment of the first aspect, the determining, by the first intelligent agent, that an object to which the invitation message or the recommendation message is to be sent is the second intelligent agent includes: obtaining, by the first intelligent agent according to a label of the first intelligent agent and a label of another intelligent agent, a measurement value of an interest similarity between a first user corresponding to the first user account and a user corresponding to the another intelligent agent, where the another intelligent agent refers to an intelligent agent that has an association relationship with the first intelligent agent; and determining, according to the measurement value, that the object to which the invitation message or the recommendation message is to be sent is the second intelligent agent.

In a fourth possible embodiment, with reference to the third possible embodiment of the first aspect, the determining, by the first intelligent agent, that an object to which the invitation message or the recommendation message is to be sent is the second intelligent agent includes: determining, by the first intelligent agent, the invitation message or the recommendation message according to operation information of a user account corresponding to the another intelligent agent; and determining, according to the invitation message or the recommendation message and the label of the another intelligent agent, that the object to which the invitation message or the recommendation message is to be sent is the second intelligent agent.

In a fifth possible embodiment, with reference to the first aspect or any one of the foregoing possible embodiments of the first aspect, when the request message is a learning invitation message, the decision message includes related information of the second intelligent agent to be shared with the first intelligent agent, or the decision message is refusing to share the related information of the second intelligent agent with the first intelligent agent, where the related information includes at least any one of the following: a learning model, data, and activity arrangement; and the updating, by the first intelligent agent according to the decision message, a knowledge model of the first intelligent agent or sending, by the first intelligent agent according to the decision message, a notification message to a first user account corresponding to the first intelligent agent includes:

learning, by the first intelligent agent, the related information of the second intelligent agent when the decision message is the related information of the second intelligent agent to be shared with the first intelligent agent, and updating the knowledge model of the first intelligent agent; or updating, by the first intelligent agent when the decision message is refusing to share the related information of the second intelligent agent with the first intelligent agent, the knowledge model of the first intelligent agent according to a case in which the second intelligent agent refuses the learning invitation message.

In a sixth possible embodiment, with reference to the fifth possible embodiment of the first aspect, after the learning, by the first intelligent agent, the related information of the second intelligent agent when the decision message is the related information of the second intelligent agent to be shared with the first intelligent agent, and updating the knowledge model of the first intelligent agent, the method further includes: obtaining, by the first intelligent agent, a learning outcome by using learned content and by comparing the decision message with the knowledge model of the first intelligent agent; and feeding back, by the first intelligent agent, the learning outcome to the second intelligent agent, so that the second intelligent agent updates the knowledge model of the second intelligent agent according to the learning outcome.

In a seventh possible embodiment, with reference to the first aspect or any one possible embodiment of the first possible embodiment to the fourth possible embodiment of the first aspect, when the request message is an activity invitation message, the decision message includes a message for agreeing to or refusing an activity invitation; and the updating, by the first intelligent agent according to the decision message, a knowledge model of the first intelligent agent or sending, by the first intelligent agent according to the decision message, a notification message to a first user account corresponding to the first intelligent agent includes: sending, by the first intelligent agent when the decision message is the message for agreeing to the activity invitation, the notification message to the first user account corresponding to the first intelligent agent, so that information that the second intelligent agent accepts the activity invitation is displayed on the first user account; or updating, by the first intelligent agent when the decision message is the message for refusing the activity invitation, the knowledge model of the first intelligent agent according to a case in which the second intelligent agent refuses the activity invitation message.

In an eighth possible embodiment, with reference to the first aspect or any one possible embodiment of the first possible embodiment to the fourth possible embodiment of the first aspect, when the request message is the recommendation message, the decision message includes accepting or refusing the recommendation message; and the updating, by the first intelligent agent according to the decision message, a knowledge model of the first intelligent agent or sending, by the first intelligent agent according to the decision message, a notification message to a first user account corresponding to the first intelligent agent includes: updating, by the first intelligent agent, the knowledge model of the first intelligent agent according to the decision message when the decision message is accepting or refusing the recommendation message.

In a ninth possible embodiment, with reference to the first aspect or any one of the foregoing possible embodiments of the first aspect, the sending, by a first intelligent agent, a request message to a second intelligent agent includes: sending, by the first intelligent agent by itself, the request message to the second intelligent agent, where before the first intelligent agent directly sends the request message to the second intelligent agent, the first intelligent agent does not notify the first user account and/or receives no instruction sent by using a terminal device by the first user corresponding to the first user account, where the instruction is used to instruct the first intelligent agent to send the request message to the second intelligent agent.

According to a second aspect, the present invention provides an intelligent agent, including: a sending unit, configured to send a request message to a second intelligent agent, where the request message includes an invitation message or a recommendation message sent to the second intelligent agent; a receiving unit, configured to receive a decision message fed back by the second intelligent agent, where the decision message is a message that is determined by the second intelligent agent according to the invitation message or the recommendation message and a knowledge model of the second intelligent agent; and a processing unit, configured to update, according to the decision message, a knowledge model of itself or send a notification message to a first user account corresponding to the intelligent agent.

In a first possible embodiment, with reference to the second aspect, the sending unit is specifically configured to: send the request message to the second intelligent agent at any moment; or predict an idle time of a second user account by learning a historical posting time of the second user account, and send the request message to the second intelligent agent at the idle time of the second user account, where the second user account corresponds to the second intelligent agent.

In a second possible embodiment, with reference to the second aspect, the sending unit includes: a determining subunit, configured to determine that an object to which the invitation message or the recommendation message is to be sent is the second intelligent agent; and a message sending subunit, configured to send the invitation message or the recommendation message to the second intelligent agent.

In a third possible embodiment, with reference to the second possible embodiment of the second aspect, the determining subunit is specifically configured to: obtain, according to a label of itself and a label of another intelligent agent, a measurement value of an interest similarity between a first user corresponding to the first user account and a user corresponding to the another intelligent agent, where the another intelligent agent refers to an intelligent agent that has an association relationship with the first intelligent agent; and determine, according to the measurement value, that the object to which the invitation message or the recommendation message is to be sent is the second intelligent agent.

In a fourth possible embodiment, with reference to the third possible embodiment of the second aspect, the determining subunit is specifically configured to: determine the invitation message or the recommendation message according to operation information of a user account corresponding to the another intelligent agent; and determine, according to the invitation message or the recommendation message and the label of the another intelligent agent, that the object to which the invitation message or the recommendation message is to be sent is the second intelligent agent.

In a fifth possible embodiment, with reference to the second aspect or any one of the foregoing possible embodiments of the second aspect, when the request message is a learning invitation message, the decision message includes related information of the second intelligent agent to be shared with the intelligent agent, or the decision message is refusing to share related information of the second intelligent agent with the intelligent agent, where the related information includes at least any one of the following: a learning model, data, and activity arrangement; and the processing unit is specifically configured to: learn the related information of the second intelligent agent when the decision message is the related information of the second intelligent agent to be shared with the intelligent agent, and update the knowledge model of itself; or update, when the decision message is refusing to share the related information of the second intelligent agent with the intelligent agent, the knowledge model of itself according to a case in which the second intelligent agent refuses the learning invitation message.

In a sixth possible embodiment, with reference to the fifth possible embodiment of the second aspect, the intelligent agent further includes an acquiring unit, where the acquiring unit is configured to obtain a learning outcome by using learned content and by comparing the decision message with the knowledge model of itself; and the sending unit is further configured to feed back the learning outcome to the second intelligent agent, so that the second intelligent agent updates the knowledge model of the second intelligent agent according to the learning outcome.

In a seventh possible embodiment, with reference to the second aspect or any one possible embodiment of the first possible embodiment to the fourth possible embodiment of the second aspect, when the request message is an activity invitation message, the decision message includes a message for agreeing to or refusing an activity invitation; and the processing unit is specifically configured to: send, when the decision message is the message for agreeing to the activity invitation, the notification message to the first user account corresponding to the first intelligent agent, so that information that the second intelligent agent accepts the activity invitation is displayed on the first user account; or update, when the decision message is the message for refusing the activity invitation, the knowledge model of itself according to a case in which the second intelligent agent refuses the activity invitation message.

In an eighth possible embodiment, with reference to the second aspect or any one possible embodiment of the first possible embodiment to the fourth possible embodiment of the second aspect, when the request message is the recommendation message, the decision message includes accepting or refusing the recommendation message; and the processing unit is specifically configured to:

update the knowledge model of itself according to the decision message when the decision message is accepting or refusing the recommendation message.

In a ninth possible embodiment, with reference to the second aspect or any one of the foregoing possible embodiments of the second aspect, the sending unit is specifically configured to send the request message to the second intelligent agent by itself, where before directly sending the request message to the second intelligent agent, the first intelligent agent does not notify the first user account and/or receives no instruction sent by using a terminal device by the first user corresponding to the first user account, where the instruction is used to instruct the first intelligent agent to send the request message to the second intelligent agent.

According to a third aspect, the present invention provides a system for processing information by an intelligent agent, including an intelligent agent management device and at least one intelligent agent, where the at least one intelligent agent refers to the foregoing intelligent agent according to any one possible embodiment of the second aspect; and the intelligent agent management device is configured to manage and control the at least one intelligent agent, and determine a common rule of the at least one intelligent agent by analyzing a behavior pattern of the at least one intelligent agent, so that a message sent by any intelligent agent of the at least one intelligent agent may be delivered and processed between the at least one intelligent agent.

According to a fourth aspect, the present invention provides a terminal device, where the terminal device includes at least one intelligent agent according to any one possible embodiment of the second aspect.

The embodiments of the present invention provide a method for processing information by an intelligent agent and the intelligent agent. A first intelligent agent sends a request message to a second intelligent agent; the first intelligent agent receives a decision message fed back by the second intelligent agent, where the decision message is a message that is determined by the second intelligent agent according to the invitation message or the recommendation message and a knowledge model of the second intelligent agent; and the first intelligent agent updates, according to the decision message, a knowledge model of the first intelligent agent or sends a notification message to a first user account corresponding to the first intelligent agent. In the prior art, when information on a social network is processed, because a classification or clustering method is for processing independent and identically distributed data, and the information on the social network generally has a personalized feature, it is improper to process the information on the social network by using a conventional classification or clustering method; therefore, mining of data on the social network cannot be implemented. Compared with the prior art, in the embodiments of the present invention, a first intelligent agent interacts with another intelligent agent to learn and process information on a social network, thereby implementing mining of data on the social network.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
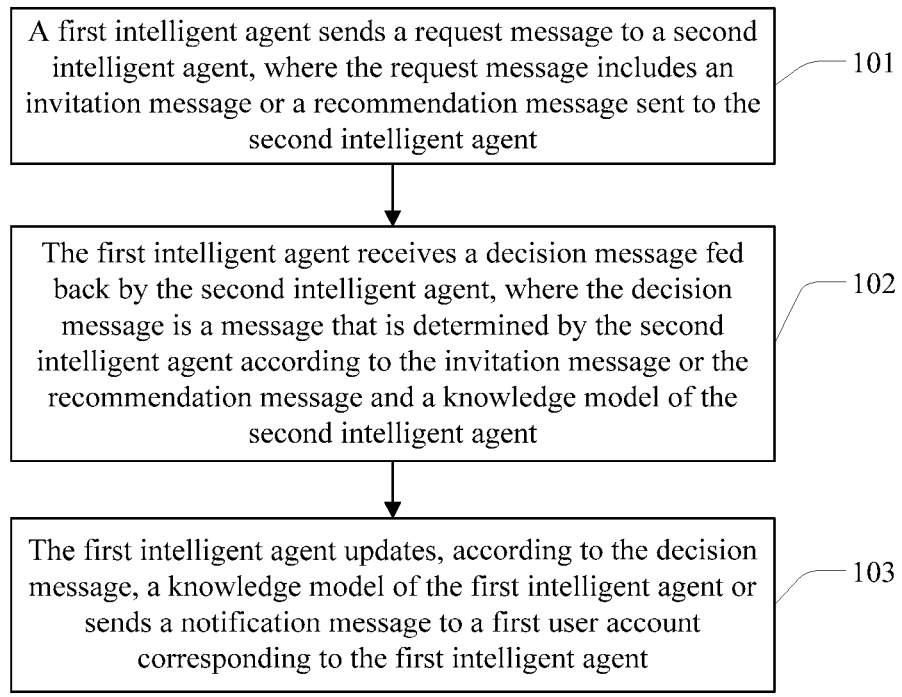
FIG. 1 is a flowchart of a method for processing information by an intelligent agent according to an embodiment of the present invention.

An embodiment of the present invention provides a method for processing information by an intelligent agent, where the method may be executed by a terminal, and specifically, may be executed by a first intelligent agent on the terminal. As shown in FIG. 1, the method includes:

Step 101: A first intelligent agent sends a request message to a second intelligent agent, where the request message includes an invitation message or a recommendation message sent to the second intelligent agent.

Optionally, "first" and "second" in the first intelligent agent and the second intelligent agent are used not for sorting the intelligent agents, but for distinguishing different intelligent agents and for ease of description.

Optionally, an intelligent agent is a virtual machine learning program installed for each social network user. One intelligent agent corresponds to one user account. In this embodiment, the user account refers to that an application can be logged in to by using the user account, and further, may be understood as a personal webpage of a user in the application. For example, the application may be microblog, WeChat, or the like, and no limitation is imposed on the application in this embodiment. Intelligent agents may interact with each other. For example, the intelligent agents may learn from each other, for example, learn information about an entity, a time, an address, and the like that is identified by another intelligent agent, where the entity may be a name of a real object that actually exists, or the like. Optionally, in this step, when the first intelligent agent sends the request message to the second intelligent agent, the request message is not sent from a first user account corresponding to the first intelligent agent by using a terminal device; instead, the first intelligent agent autonomously sends the request message.

Optionally, the first intelligent agent sends the request message to the second intelligent agent by itself, where before the first intelligent agent directly sends the request message to the second intelligent agent, the first intelligent agent does not notify the first user account and/or receives no instruction sent by using a terminal device by a first user corresponding to the first user account, where the instruction is used to instruct the first intelligent agent to send the request message to the second intelligent agent.

The first intelligent agent sends, when sending the request message to the second intelligent agent, the request message to the second intelligent agent at any moment; or the first intelligent agent predicts an idle time of a second user account by learning a historical posting time of the second user account, and the first intelligent agent sends the request message to the second intelligent agent at the idle time of the second user account, where the second user account corresponds to the second intelligent agent.

Optionally, this step includes: obtaining, by the first intelligent agent according to a label of the first intelligent agent and a label of another intelligent agent, a measurement value of an interest similarity between the first user corresponding to the first user account and a user corresponding to the another intelligent agent, where the another intelligent agent refers to an intelligent agent that has an association relationship with the first intelligent agent; and determining, according to the measurement value, that an object to which the invitation message or the recommendation message is to be sent is the second intelligent agent.

Step 102: The first intelligent agent receives a decision message fed back by the second intelligent agent, where the decision message is a message that is determined by the second intelligent agent according to the invitation message or the recommendation message and a knowledge model of the second intelligent agent.

After receiving the request message sent by the first intelligent agent, the second intelligent agent determines, according to the knowledge model of the second intelligent agent and the request message, whether the received request message matches the knowledge model of the second intelligent agent, where when the received request message matches the knowledge model of the second intelligent agent, the request message may be accepted, or when the received request message does not match the knowledge model of the second intelligent agent, the request message may be refused. Optionally, the decision message is a message that is determined according to the invitation message or the recommendation message, that is, a message including accepting a request or refusing a request.

Step 103: The first intelligent agent updates, according to the decision message, a knowledge model of the first intelligent agent or sends a notification message to a first user account corresponding to the first intelligent agent.

Optionally, the first intelligent agent may learn related knowledge of the second intelligent agent according to the decision message, to update the knowledge model of the first intelligent agent; in this case, the decision message may be a message for accepting or refusing a request. The first intelligent agent may further send a notification message to the first user account when the decision message includes a message indicating that the second intelligent agent accepts the request.

Further optionally, intelligent agents have a same function. That is, an operation performed by the first intelligent agent may also be performed by the second intelligent agent, and an operation performed by the second intelligent agent may also be performed by the first intelligent agent. It may be understood that the first intelligent agent may also make, after receiving a request message sent by another intelligent agent, a decision according to the request message, and sends a decision message to the another intelligent agent, that is, the first intelligent agent has a function of the second intelligent agent in this embodiment. For example, the first intelligent agent receives the request message sent by the second intelligent agent; the first intelligent agent determines the decision message according to the request message and the knowledge model of the first intelligent agent; and the first intelligent agent sends the decision message to the second intelligent agent.

This embodiment of the present invention provides a method for processing information by an intelligent agent. A first intelligent agent interacts with a second intelligent agent, so that the first intelligent agent can learn a knowledge model of the second intelligent agent to update a knowledge model of the first intelligent agent; or a first intelligent agent negotiates with a second intelligent agent, and notifies a user account of a negotiation result; therefore, information on a social network is learned and processed by means of interaction with another intelligent agent, thereby implementing mining of data on the social network.

The following uses specific embodiments to describe the solutions of the present invention.

Figure 2:
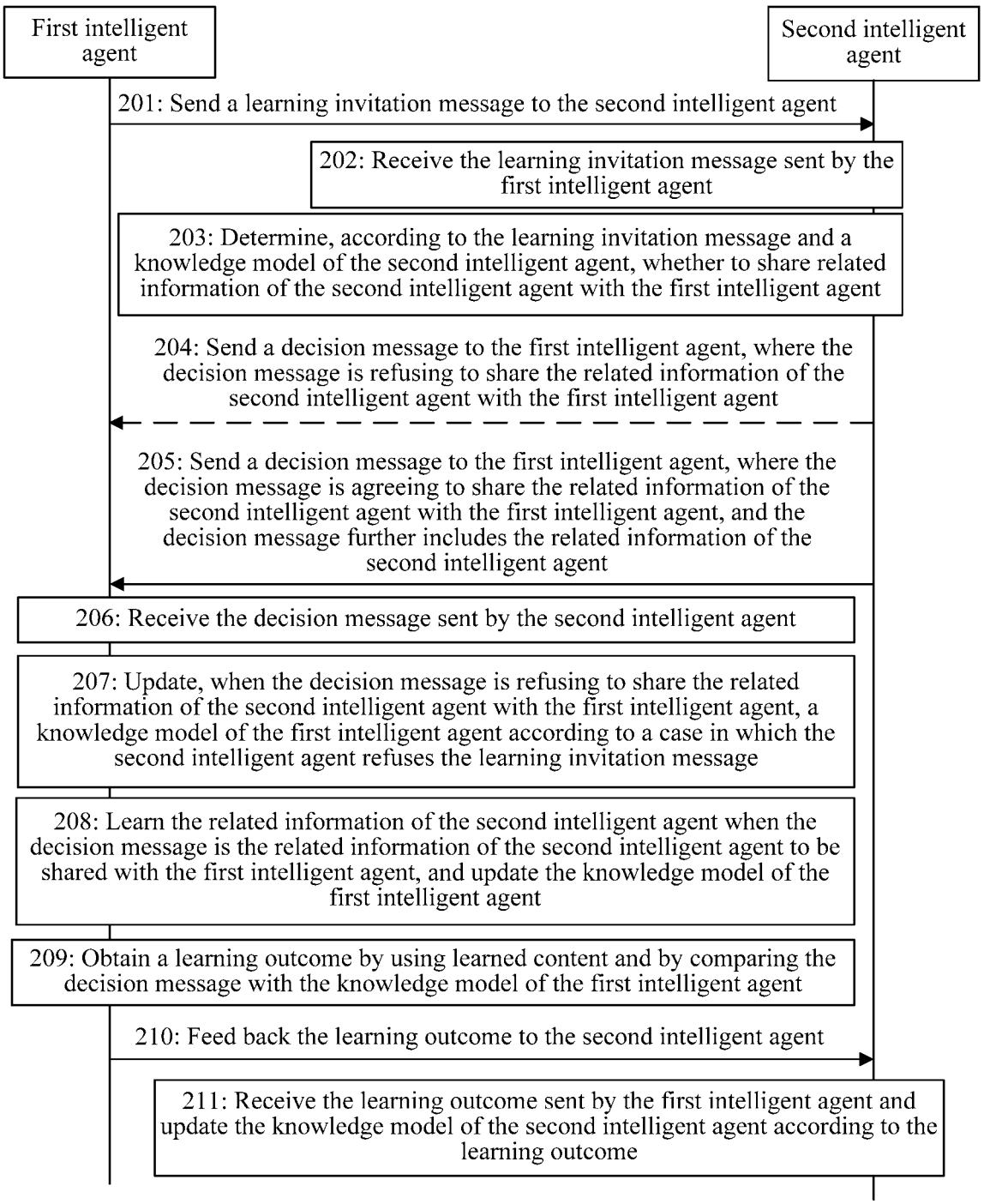
FIG. 2 is a flowchart of another method for processing information by an intelligent agent according to an embodiment of the present invention.

As shown in FIG. 2, this embodiment of the present invention provides another method for processing information by an intelligent agent, where the method includes:

Step 201: A first intelligent agent sends a learning invitation message to a second intelligent agent.

Optionally, the first intelligent agent and the second intelligent agent represent an intelligent agent of a first user account and an intelligent agent of a second user account respectively. One intelligent agent corresponds to one user account.

Either of the first intelligent agent and the second intelligent agent may be any intelligent agent. In this embodiment, "first" and "second" are used not for sorting the intelligent agents, but only for ease of description; "first" and "second" in a first user and a second user are used not for sorting the users, but only for ease of description.

Optionally, a time at which the first intelligent agent sends the learning invitation message to the second intelligent agent may be determined in the following manners:

sending, by the first intelligent agent, the learning invitation message to the second intelligent agent at any moment; or predicting, by the first intelligent agent by learning a historical posting time of a second user account corresponding to the second intelligent agent, an idle time of the second user account corresponding to the second intelligent agent, and sending, by the first intelligent agent, the learning invitation message to the second intelligent agent at the idle time of the second user account.

Optionally, an intelligent agent may learn information about another intelligent agent. The first intelligent agent extracts a time feature by learning a historical posting time of a user account corresponding to another intelligent agent, and then, the first intelligent agent learns the extracted time feature, establishes a classification model, predicts an idle time of the another user account, and sends the learning invitation message to the another intelligent agent at the idle time.

Optionally, the first intelligent agent may send, according to a preference of a user corresponding to another intelligent agent, the learning invitation message to the intelligent agent corresponding to the user, where the another intelligent agent refers to an intelligent agent that has an association relationship with the first intelligent agent. For example, the first intelligent agent obtains, according to a label of the first intelligent agent and a label of another intelligent agent, a measurement value of an interest similarity between a first user corresponding to the first user account and a user corresponding to the another intelligent agent; and determines, according to the measurement value, that an object to which the learning invitation message is to be sent is the second intelligent agent, and sends the learning invitation message to the second intelligent agent.

Optionally, a label may be an identifier that is created according to information posted under a user account. For example, a label is created according to a name, of a watched film, posted under a user account, or a label is created according to content or a name, of an activity that is participated in, posted under a user account, or a label is created according to food posted under a user account. No limitation is imposed on content of a label of an intelligent agent in the present invention.

Optionally, the first intelligent agent determines the invitation message or the recommendation message according to operation information of a user account corresponding to a label of an intelligent agent; and determines, according to the invitation message or the recommendation message and a label of a friend, that an object to which the invitation message or the recommendation message is to be sent is the second intelligent agent, and sends a learning invitation message to the second intelligent agent.

Optionally, the first intelligent agent may determine, according to operation information of a user account corresponding to the another intelligent agent, a preference of a user corresponding to the another intelligent agent. For example, the first intelligent agent determines, according to an operation such as click or reply performed on information by a user corresponding to another intelligent agent, a type of information or a game liked by the user corresponding to the another intelligent agent, or the like.

It should be noted that when the first intelligent agent predicts an idle time of a user account corresponding to another intelligent agent or determines that an object to which the learning invitation message is to be sent is the second intelligent agent, a used prediction method may include the following manners:

using a classification method such as a support vector machine (Support Vector Machine, SVM) or a decision tree to learn and classify matters about labels, opinions, and the like of a user;

using a time series analysis model, such as an autoregressive model (Autoagressive model, AR), an auto-regressive and moving average model (Auto-Regressive and Moving Average model, ARMA), or a generalized auto-regressive conditional heteroskedasticity model (Generalized Auto-Regressive Conditional Heteroskedasticity model, GARCH) to model a user-related time series, for example, a check-in check-in behavior or a posting time of a user, and to predict the future, for example, predict an idle time of a user account;

using a topic model, for example, a Latent Dirichlet Allocation model (Latent Dirichlet Allocation, LDA) or probabilistic latent semantic analysis (probabilistic Latent Semantic Analysis, PLSA), to model and predict a label of a user; and using a list of information about a Global Positioning System (Global Position System, GPS), a time, an extracted entity, and the like to comprehensively predict a position, an idle time, and an attribute of a user.

Optionally, the first intelligent agent may send the learning invitation message to at least one intelligent agent. In the present invention, that the first intelligent agent sends the learning invitation message to one intelligent agent is used as an example for description.

Step 202: The second intelligent agent receives the learning invitation message sent by the first intelligent agent.

Step 203: The second intelligent agent determines, according to the learning invitation message and a knowledge model of the second intelligent agent, whether to share related information of the second intelligent agent with the first intelligent agent.

The related information of the second intelligent agent includes at least one of the following: a learning model, data, and activity arrangement. Certainly, the related information of the second intelligent agent may further include other information, and no limitation is imposed on the related information in this embodiment.

Optionally, the knowledge model of the second intelligent agent may be a rule that is obtained by learning according to information posted by a second user corresponding to the second intelligent agent or a rule that is obtained by learning when the second intelligent agent interacts with another intelligent agent. For example, the knowledge model of the second intelligent agent may include whether information about a hobby of the second user, a posting time of the second user, and a learning model, data, and activity arrangement of the second user, and the like can be shared with another intelligent agent, and the like.

Step 204: Send a decision message to the first intelligent agent when the second intelligent agent does not share the related information of the second intelligent agent with the first intelligent agent, where the decision message is refusing to share the related information of the second intelligent agent with the first intelligent agent.

Step 205: Send a decision message to the first intelligent agent when the second intelligent agent shares the related information of the second intelligent agent with the first intelligent agent, where the decision message is agreeing to share the related information of the second intelligent agent with the first intelligent agent, and the decision message further includes the related information of the second intelligent agent.

Step 206: The first intelligent agent receives the decision message sent by the second intelligent agent.

Step 207: The first intelligent agent updates, when the decision message is refusing to share the related information of the second intelligent agent with the first intelligent agent, a knowledge model of the first intelligent agent according to a case in which the second intelligent agent refuses the learning invitation message.

Optionally, the first intelligent agent may learn the case in which the second intelligent agent refuses the learning invitation message, so that no learning invitation message or other related information is to be sent to the second intelligent agent subsequently.

Step 208: The first intelligent agent learns the related information of the second intelligent agent when the decision message is the related information of the second intelligent agent to be shared with the first intelligent agent, and updates the knowledge model of the first intelligent agent.

Optionally, the first intelligent agent may learn related information of another intelligent agent, so as to enrich the knowledge model of the first intelligent agent, resulting in better communication with the another intelligent agent.

Optionally, the first intelligent agent may learn the learning model, the data, the activity arrangement, or the like of the second intelligent agent, so as to better know the second user corresponding to the second intelligent agent.

The first intelligent agent may learn knowledge about an entity, a place, a time, or the like of the second intelligent agent, where the entity refers to an object that actually exists, for example, a name of a thing. In addition, the first intelligent agent may further learn a label of the second intelligent agent, so as to obtain, by collecting statistics on label distribution, a picture of a community in which the first intelligent agent is located, or to better know the second intelligent agent. Optionally, the first intelligent agent may further effectively transfer sample data of the second intelligent agent to a learning matter of the first intelligent agent by using a transfer learning technology. It should be noted that the transfer learning technology is different from a transfer learning technology in the prior art. When the sample data of the second intelligent agent does not conflict with sample data of the first intelligent agent, learning is performed by using a same transfer learning technology as in the prior art; or when the sample data of the second intelligent agent conflicts with sample data of the first intelligent agent, the conflicted sample data of the second intelligent agent is rejected and is not learned.

Step 209: The first intelligent agent obtains a learning outcome by using learned content and by comparing the decision message with the knowledge model of the first intelligent agent.

Optionally, the learning outcome may include the content in the related information of the second intelligent agent that has been learned by the first intelligent agent, content conflicting with that of the second intelligent agent, and/or the like.

Step 210: The first intelligent agent feeds back the learning outcome to the second intelligent agent.

Step 211: The second intelligent agent receives the learning outcome sent by the first intelligent agent and updates the knowledge model of the second intelligent agent according to the learning outcome.

Optionally, a method for updating the knowledge model of the second intelligent agent by the second intelligent agent is the same as a method for updating the knowledge model of the first intelligent agent by the first intelligent agent. It can be understood that, the first intelligent agent and the second intelligent agent learn from each other to enrich their knowledge models.

Optionally, when an intelligent agent updates its knowledge model, a distributed computing mode or a cloud computing mode may be used. For example, for complex analysis and computing, the cloud computing mode may be used. That is, the intelligent agent sends related computing parameters to the cloud, and after computing is complete on the cloud, a computing result is fed back to the intelligent agent. It should be noted that an intelligent agent may compute complexity of a learning method. For example, when a model is trained, the complexity is generally related to a quantity N of training samples, related to a quantity of dimensions of a sample, and related to computing or the like required by an algorithm. When there is a relatively large quantity of training samples, or there is a relatively large quantity of dimensions of a sample, or there is a large computing amount in an algorithm, computing complexity is relatively high, and in this case, computing may be performed on the cloud. Optionally, interaction and reminding functions may be implemented on a terminal.

It should be noted that, when intelligent agents interact with each other, user accounts corresponding to the intelligent agents may be not notified, that is, no reminding or notification message is sent to the user accounts corresponding to the intelligent agents.

This embodiment of the present invention provides a method for processing information by an intelligent agent. Information on a social network is learned and processed by means of interaction with another intelligent agent, thereby implementing mining of data on the social network and enriching respective knowledge models.

Figure 3:
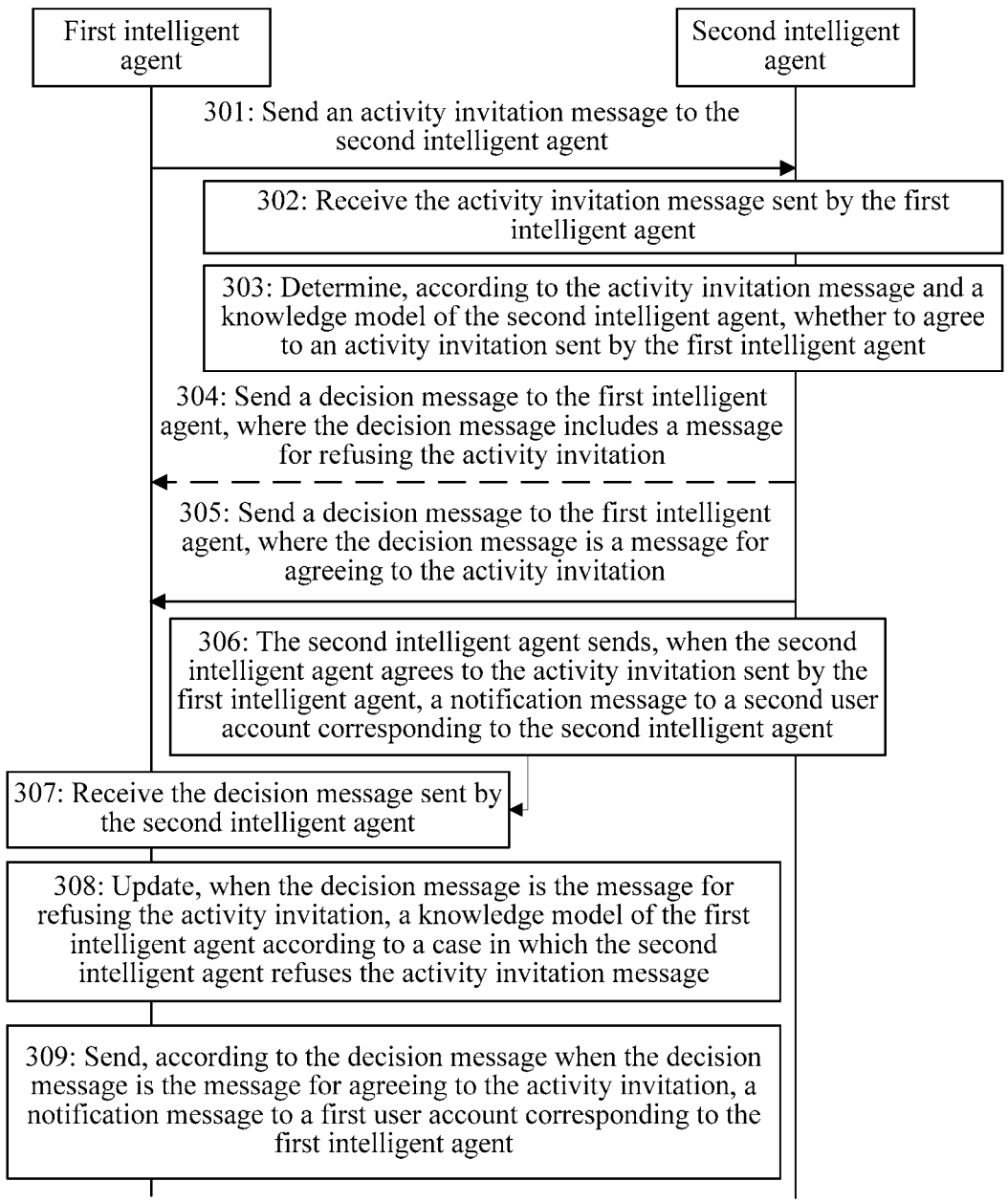
FIG. 3 is a flowchart of another method for processing information by an intelligent agent according to an embodiment of the present invention.

As shown in FIG. 3, an embodiment of the present invention provides another method for processing information by an intelligent agent, where the method includes:

Step 301: A first intelligent agent sends an activity invitation message to a second intelligent agent.

Optionally, this step is similar to step 201 in FIG. 2. For example, the first intelligent agent may send the activity invitation message to the second intelligent agent at any moment; or the first intelligent agent predicts an idle time of a second user account by learning a historical posting time of the second user account, and the first intelligent agent sends a request message to the second intelligent agent at the idle time of the second user account, where the second user account corresponds to the second intelligent agent.

Alternatively, the first intelligent agent selects the second intelligent agent according to a preference and sends the activity invitation message to the second intelligent agent.

Details are not repeatedly described in this embodiment, and specifically, reference may be made to step 201.

Further, the activity invitation message may further include information about a conference time, a conference place, a conference subject, and the like.

Step 302: The second intelligent agent receives the activity invitation message sent by the first intelligent agent.

The activity invitation message may be an activity invitation, an appointment invitation, a conversation invitation, or the like, and no limitation is imposed on the activity invitation message in this embodiment of the present invention.

Step 303: The second intelligent agent determines, according to the activity invitation message and a knowledge model of the second intelligent agent, whether to agree to an activity invitation sent by the first intelligent agent.

Step 304: Send a decision message to the first intelligent agent when the second intelligent agent does not agree to the activity invitation sent by the first intelligent agent, where the decision message includes a message for refusing the activity invitation.

Step 305: Send a decision message to the first intelligent agent when the second intelligent agent agrees to the activity invitation sent by the first intelligent agent, where the decision message is a message for agreeing to the activity invitation.

Step 306: The second intelligent agent sends, when the second intelligent agent agrees to the activity invitation sent by the first intelligent agent, a notification message to a second user account corresponding to the second intelligent agent, so that information that the second intelligent agent accepts the activity invitation is displayed on the second user account.

Step 307: The first intelligent agent receives the decision message sent by the second intelligent agent.

Step 308: The first intelligent agent updates, when the decision message is the message for refusing the activity invitation, a knowledge model of the first intelligent agent according to a case in which the second intelligent agent refuses the activity invitation message.

Optionally, the first intelligent agent may learn the case in which the second intelligent agent refuses the activity invitation message, so that no activity invitation message or other related information is to be sent to the second intelligent agent subsequently.

Step 309: Send, according to the decision message when the decision message is the message for agreeing to the activity invitation, a notification message to a first user account corresponding to the first intelligent agent, so that information that the second intelligent agent accepts the activity invitation is displayed on the first user account.

After the notification message sent by the first intelligent agent or the second intelligent agent is received by the first user account and the second user account, a first user and a second user may prepare for a conference according to the activity invitation message.

This embodiment of the present invention provides a method for processing information by an intelligent agent. Coordination between a first intelligent agent and a second intelligent agent helps a first user and a second user make a conference reservation; therefore, user experience can be improved.

Figure 4:
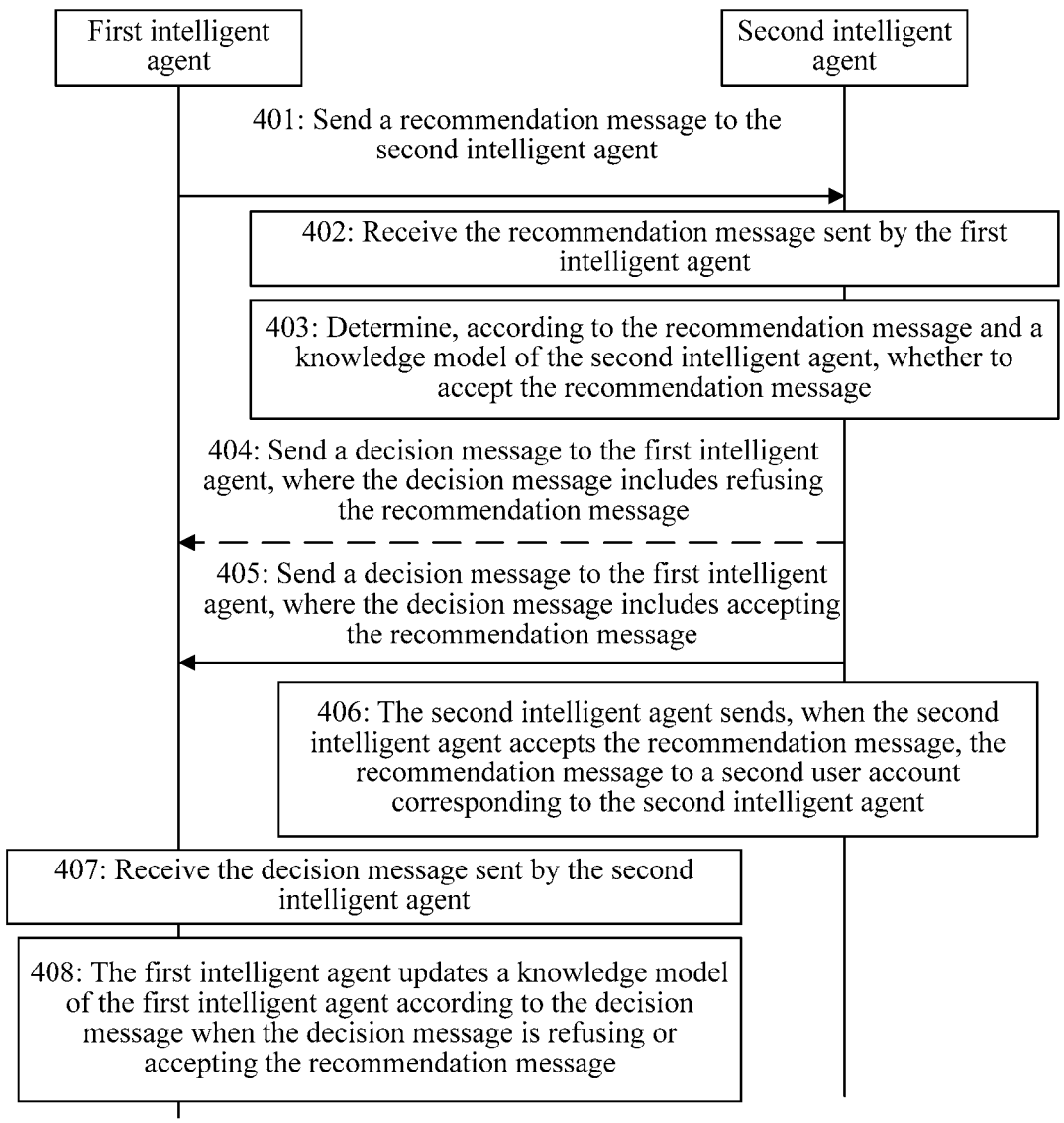
FIG. 4 is a flowchart of another method for processing information by an intelligent agent according to an embodiment of the present invention.

As shown in FIG. 4, an embodiment of the present invention provides another method for processing information by an intelligent agent, where the method includes:

Step 401: A first intelligent agent sends a recommendation message to a second intelligent agent.

Optionally, this step is similar to step 201 in FIG. 2. For example, the first intelligent agent may send the recommendation message to the second intelligent agent at any moment; or the first intelligent agent predicts an idle time of a second user account by learning a historical posting time of the second user account, and the first intelligent agent sends a request message to the second intelligent agent at the idle time of the second user account, where the second user account corresponds to the second intelligent agent.

Alternatively, the first intelligent agent selects a second intelligent agent according to a preference and sends the recommendation message to the second intelligent agent.

Details are not repeatedly described in this embodiment, and specifically, reference may be made to step 201.

Further, the recommendation message may further include information about a to-be-recommended link and the like, for example, a link to a recommended film or a link to recommended goods; or the recommendation message may include recommended content, for example, a recommended comment or a recommended picture.

The recommendation message may include information that is predicted by the first intelligent agent by learning operation information of another intelligent agent and that is liked by a user corresponding to the intelligent agent.

The another intelligent agent refers to an intelligent agent that has an association relationship with the first intelligent agent.

Step 402: The second intelligent agent receives the recommendation message sent by the first intelligent agent.

Step 403: The second intelligent agent determines, according to the recommendation message and a knowledge model of the second intelligent agent, whether to accept the recommendation message.

For example, the recommendation message includes information about a link to a film, a name of the film, and the like. The second intelligent agent determines whether the name of the film matches an interest or a preference of a second user, and accepts the recommendation message if the name of the film matches the interest or the preference of the second user, or does not accept the recommendation message if the name of the film does not match the interest or the preference of the second user.

Step 404: Send a decision message to the first intelligent agent when the second intelligent agent does not accept the recommendation message, where the decision message includes refusing the recommendation message.

Step 405: Send a decision message to the first intelligent agent when the second intelligent agent accepts the recommendation message, where the decision message includes accepting the recommendation message.

Step 406: The second intelligent agent sends, when the second intelligent agent accepts the recommendation message, the recommendation message to a second user account corresponding to the second intelligent agent, so as to display, on the second user account, that the second intelligent agent accepts the recommendation message.

After the recommendation message sent by the second intelligent agent is received by the second user account, the second user may process the recommendation message by using a terminal device, for example, watch the link to the film in the recommendation message or directly delete the recommendation message.

Step 407: The first intelligent agent receives the decision message sent by the second intelligent agent.

Step 408: The first intelligent agent updates a knowledge model of the first intelligent agent according to the decision message when the decision message is refusing or accepting the recommendation message.

Optionally, the first intelligent agent summarizes recommended users and related content according to the received decision message and updates the knowledge model of the first intelligent agent. For example, if the received decision message is accepting the recommendation message, the first intelligent agent updates the second intelligent agent and the recommendation message to the knowledge model of the first intelligent agent, so as to provide a basis when other information is recommended to the second intelligent agent subsequently.

Optionally, the first intelligent agent summarizes, according to the received decision message, a case in which the second intelligent agent refuses to accept the recommendation message, and updates the knowledge model of the first intelligent agent, so that no related recommendation message or other related information is recommended to the second intelligent agent subsequently.

This embodiment of the present invention provides a method for processing information by an intelligent agent. Interaction between a first intelligent agent and a second intelligent agent enables the first intelligent agent to directly recommend a message to the second intelligent agent without a user, and after recommendation succeeds, the second intelligent agent notifies a second user account, which can improve user experience.

The solutions provided in the embodiments of the present invention may be applied to microblog, WeChat, or a smartphone. For example, a microblog and WeChat assistant may send an invitation to a friend in a circle of friends according to an interest or a demand and time arrangement of a user, and the friend determines, according to arrangement of the friend after an assistant of the friend receives the invitation, whether to reply. For example, the microblog and WeChat assistant may recommend interesting content according to interests of the user and the friend, and the assistant of the friend may help the friend filter out unwanted information, thereby effectively performing content recommendation. For example, a smartphone assistant may perform triggering by using a "Shake" function of a user, automatically select learning, coordination, and recommended functions in manners of a time, a place, an interest, and the like, and interact with a nearby user shaking a mobile phone. For example, the smartphone assistant may automatically prompt, when the user sends a short message service message or an email, the user whether to use information provided by the assistant. For example, the smartphone assistant may automatically help the user perform filtering on and managing access of an application to a circle of friends, provide a prompt for the user, and perform interaction with access of another user.

Figure 5:
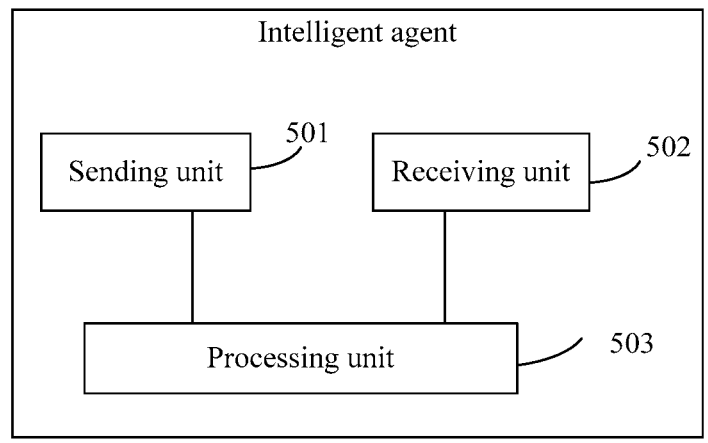
FIG. 5 is a block diagram of an intelligent agent according to an embodiment of the present invention.

An embodiment of the present invention provides an intelligent agent. As shown in FIG. 5, the intelligent agent includes: a sending unit 501, a receiving unit 502, and a processing unit 503.

The sending unit 501 is configured to send a request message to a second intelligent agent, where the request message includes an invitation message or a recommendation message sent to the second intelligent agent.

The sending unit 501 is specifically configured to send the request message to the second intelligent agent by itself, where before directly sending the request message to the second intelligent agent, the first intelligent agent does not notify the first user account and/or receives no instruction sent by using a terminal device by a first user corresponding to the first user account, where the instruction is used to instruct the first intelligent agent to send the request message to the second intelligent agent.

The receiving unit 502 is configured to receive a decision message fed back by the second intelligent agent, where the decision message is a message that is determined by the second intelligent agent according to the invitation message or the recommendation message and a knowledge model of the second intelligent agent.

The processing unit 503 is configured to update, according to the decision message, a knowledge model of itself or send a notification message to the first user account corresponding to the intelligent agent.

Further optionally, the sending unit 501 is specifically configured to:

send the request message to the second intelligent agent at any moment; or predict an idle time of a second user account by learning a historical posting time of the second user account, and send the request message to the second intelligent agent at the idle time of the second user account, where the second user account corresponds to the second intelligent agent.

Figure 6:
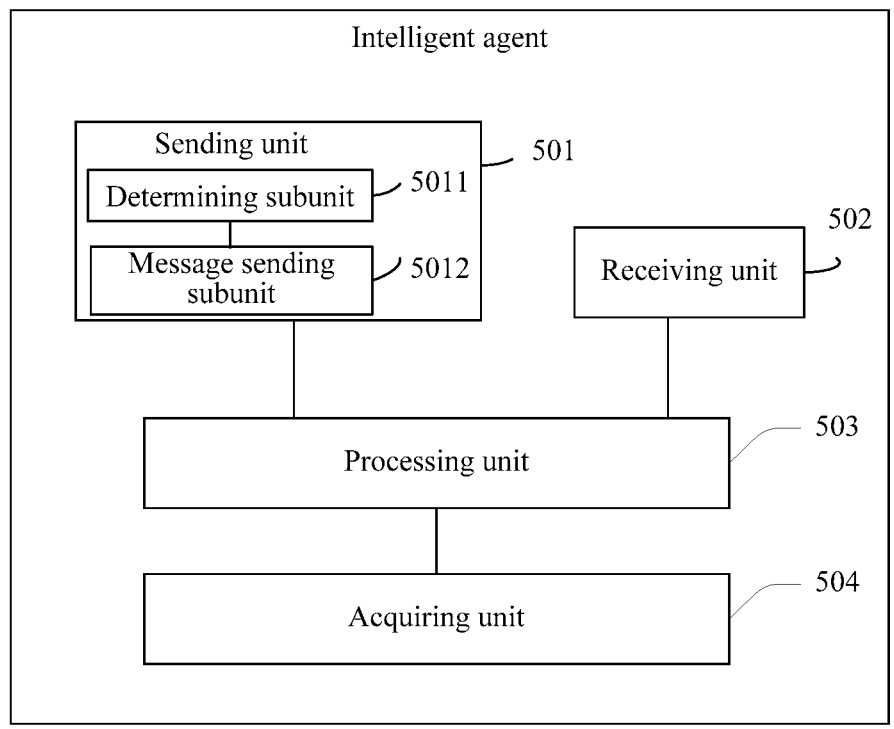
FIG. 6 is a block diagram of another intelligent agent according to an embodiment of the present invention.

Further optionally, as shown in FIG. 6, the sending unit 501 includes a determining subunit 5011 and a message sending subunit 5012.

The determining subunit 5011 is configured to determine that an object to which the invitation message or the recommendation message is to be sent is the second intelligent agent.

The message sending subunit 5012 is further configured to send the invitation message or the recommendation message to the second intelligent agent.

Further optionally, the determining subunit 5011 is specifically configured to: obtain, according to a label of itself and a label of another intelligent agent, a measurement value of an interest similarity between a first user corresponding to the first user account and a user corresponding to the another intelligent agent, where the another intelligent agent refers to an intelligent agent that has an association relationship with the first intelligent agent; and determine, according to the measurement value, that the object to which the invitation message or the recommendation message is to be sent is the second intelligent agent.

Further optionally, as shown in FIG. 6, the determining subunit 5011 is specifically configured to: determine the invitation message or the recommendation message according to operation information of a user account corresponding to the another intelligent agent; and determine, according to the invitation message or the recommendation message and the label of the another intelligent agent, that the object to which the invitation message or the recommendation message is to be sent is the second intelligent agent.

Further optionally, when the request message is a learning invitation message, the decision message includes related information of the second intelligent agent to be shared with the intelligent agent, or the decision message is refusing to share related information of the second intelligent agent with the intelligent agent, where the related information includes at least any one of the following: a learning model, data, and activity arrangement; and the processing unit 503 is specifically configured to: learn the related information of the second intelligent agent when the decision message is the related information of the second intelligent agent to be shared with the intelligent agent, and update the knowledge model of itself; or update, when the decision message is refusing to share the related information of the second intelligent agent with the intelligent agent, the knowledge model of itself according to a case in which the second intelligent agent refuses the learning invitation message.

Further optionally, as shown in FIG. 6, the apparatus further includes an acquiring unit 504.

After the processing unit 503 learns the related information of the second intelligent agent when the decision message is the related information of the second intelligent agent to be shared with the intelligent agent, and updates the knowledge model of itself, the acquiring unit 504 is configured to obtain a learning outcome by using learned content and by comparing the decision message with the knowledge model of itself. The sending unit 503 is further configured to feed back the learning outcome to the second intelligent agent, so that the second intelligent agent updates the knowledge model of the second intelligent agent according to the learning outcome.

Further optionally, when the request message is an activity invitation message, the decision message includes a message for agreeing to or refusing an activity invitation; and the processing unit 503 is specifically configured to:

send, when the decision message is the message for agreeing to the activity invitation, the notification message to the first user account corresponding to the first intelligent agent, so that information that the second intelligent agent accepts the activity invitation is displayed on the first user account; or update, when the decision message is the message for refusing the activity invitation, the knowledge model of itself according to a case in which the second intelligent agent refuses the activity invitation message.

Further optionally, when the request message is the recommendation message, the decision message includes accepting or refusing the recommendation message; and the processing unit 503 is specifically configured to:

update the knowledge model of itself according to the decision message when the decision message is accepting or refusing the recommendation message.

It should be noted that: because content such as specific implementation processes of the modules and information exchange between the modules in the apparatus shown in FIG. 5 or FIG. 6 is based on a same invention concept as the method embodiments of the present invention, reference may be made to the method embodiments and details are not repeatedly described herein.

This embodiment of the present invention provides an intelligent agent. The intelligent agent interacts with a second intelligent agent, so that the intelligent agent can learn a knowledge model of the second intelligent agent to update a knowledge model of itself; or the intelligent agent negotiates with a second intelligent agent, and notifies a user account of a negotiation result; therefore, information on a social network is learned and processed by means of interaction with another intelligent agent, thereby implementing mining of data on the social network.

An embodiment of the present invention provides a terminal device. The terminal device includes an intelligent agent, where the intelligent agent is configured to:

send a request message to a second intelligent agent, where the request message includes an invitation message or a recommendation message sent to the second intelligent agent;

receive a decision message fed back by the second intelligent agent, where the decision message is a message that is determined by the second intelligent agent according to the invitation message or the recommendation message and a knowledge model of the second intelligent agent; and update, by the intelligent agent according to the decision message, a knowledge model of itself or send a notification message to a first user account corresponding to the intelligent agent.

Further optionally, the intelligent agent sends, when sending the request message to the second intelligent agent, the request message to the second intelligent agent at any moment; or predicts an idle time of a second user account by learning a historical posting time of the second user account, and sends the request message to the second intelligent agent at the idle time of the second user account, where the second user account corresponds to the second intelligent agent.

Further optionally, the sending, by the intelligent agent, a request message to a second intelligent agent includes: determining that an object to which the invitation message or the recommendation message is to be sent is the second intelligent agent; and sending the invitation message or the recommendation message to the second intelligent agent.

Further optionally, the determining, by the intelligent agent, that an object to which the invitation message or the recommendation message is to be sent is the second intelligent agent includes:

obtaining, according to a label of itself and a label of another intelligent agent, a measurement value of an interest similarity between a first user corresponding to the first user account and a user corresponding to the another intelligent agent, where the another intelligent agent refers to an intelligent agent that has an association relationship with the first intelligent agent; and determining, according to the measurement value, that the object to which the invitation message or the recommendation message is to be sent is the second intelligent agent.

Further optionally, the determining, by the intelligent agent, that an object to which the invitation message or the recommendation message is to be sent is the second intelligent agent includes:

determining the invitation message or the recommendation message according to operation information of a user account corresponding to the another intelligent agent; and determining, according to the invitation message or the recommendation message and the label of the another intelligent agent, that the object to which the invitation message or the recommendation message is to be sent is the second intelligent agent.

Further optionally, when the request message is a learning invitation message, the decision message includes related information of the second intelligent agent to be shared with the intelligent agent, or the decision message is refusing to share related information of the second intelligent agent with the intelligent agent, where the related information includes at least any one of the following: a learning model, data, and activity arrangement; and the updating, by the intelligent agent according to the decision message, a knowledge model of itself or sends a notification message to a first user account corresponding to the intelligent agent includes:

learning, by the intelligent agent, the related information of the second intelligent agent when the decision message is the related information of the second intelligent agent to be shared with the intelligent agent, and updating the knowledge model of itself; or updating, by the intelligent agent when the decision message is refusing to share the related information of the second intelligent agent with the intelligent agent, the knowledge model of itself according to a case in which the second intelligent agent refuses the learning invitation message.

Further optionally, after the learning, by the intelligent agent, the related information of the second intelligent agent when the decision message is the related information of the second intelligent agent to be shared with the intelligent agent, and updating the knowledge model of itself, the following is further included:

obtaining, by the intelligent agent, a learning outcome by using learned content and by comparing the decision message with the knowledge model of itself; and feeding back, by the intelligent agent, the learning outcome to the second intelligent agent, so that the second intelligent agent updates the knowledge model of the second intelligent agent according to the learning outcome.

Further optionally, when the request message is an activity invitation message, the decision message includes a message for agreeing to or refusing an activity invitation; and the updating, by the intelligent agent according to the decision message, a knowledge model of itself or sends a notification message to a first user account corresponding to the intelligent agent includes:

sending, by the intelligent agent when the decision message is the message for agreeing to the activity invitation, the notification message to the first user account corresponding to the intelligent agent, so that information that the second intelligent agent accepts the activity invitation is displayed on the first user account; or updating, by the intelligent agent when the decision message is the message for refusing the activity invitation, the knowledge model of itself according to a case in which the second intelligent agent refuses the activity invitation message.

Further optionally, when the request message is the recommendation message, the decision message includes accepting or refusing the recommendation message; and the updating, by the intelligent agent according to the decision message, a knowledge model of itself or sends a notification message to a first user account corresponding to the intelligent agent includes:

updating, by the intelligent agent, the knowledge model of itself according to the decision message when the decision message is accepting or refusing the recommendation message.

Further optionally, the sending, by the intelligent agent, a request message to a second intelligent agent includes:

sending, by the intelligent agent, the request message to the second intelligent agent by itself, where before the intelligent agent directly sends the request message to the second intelligent agent, the intelligent agent does not notify the first user account and/or receives no instruction sent by using the terminal device by the first user corresponding to the first user account, where the instruction is used to instruct the intelligent agent to send the request message to the second intelligent agent.

This embodiment of the present invention provides a terminal device. The terminal device includes an intelligent agent, where the intelligent agent interacts with a second intelligent agent, so that the intelligent agent can learn a knowledge model of the second intelligent agent to update a knowledge model of itself; or the intelligent agent negotiates with a second intelligent agent, and notifies a user account of a negotiation result; therefore, information on a social network is learned and processed by means of interaction with another intelligent agent, thereby implementing mining of data on the social network.

Figure 7:
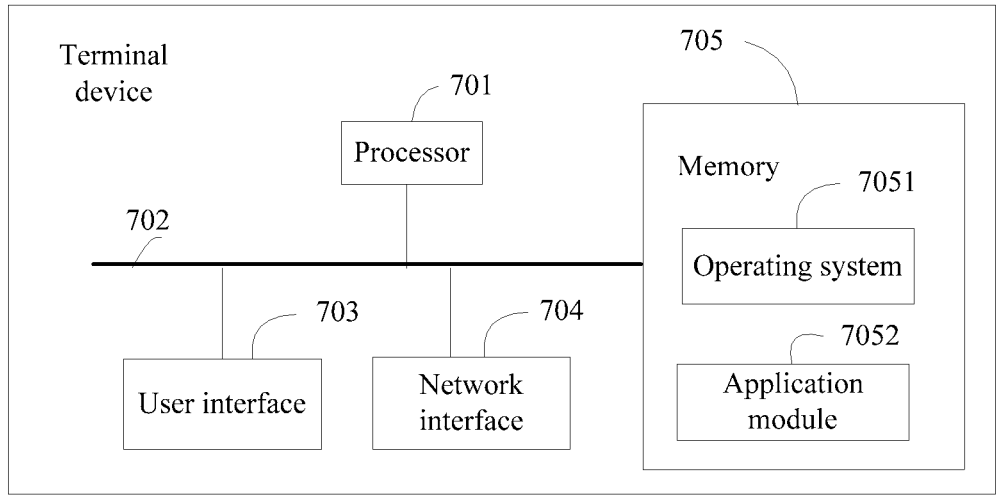
FIG. 7 is a block diagram of a terminal device according to an embodiment of the present invention.

Correspondingly, an embodiment of the present invention further provides a terminal device. As shown in FIG. 7, the terminal device may include at least one processor 701, for example, a CPU, at least one network interface 704, for example, a physical network interface card, or another user interface 703, a memory 705, and at least one communications bus 702.

The communications bus 702 is configured to implement connection communication between these components.

The network interface 704 is configured to implement connection communication between the terminal device and a network. For example, the network interface 704 may be configured to connect to a device or devices such as a physical network interface card and/or a physical switch.

Optionally, the user interface 703 may include a display, a keyboard, or another click device such as a mouse, a trackball (trackball), a touchpad, or a touch display screen.

The memory 705 may include a high-speed random access memory (RAM, Random Access Memory), or may further include a non-volatile memory (non-volatile memory), for example, at least one magnetic disk memory. Optionally, the memory 705 may further include at least one storage apparatus far away from the processor 701.

In some implementation manners, the memory 705 stores the following elements: an executable module or a data structure, or a subset thereof, or an extended set thereof:

an operating system 7051, including various system programs and configured to implement various basic services and process hardware-based tasks; and an application module 7052, including various applications and configured to implement various application services.

Specifically, the processor 701 is configured to: send a request message to a second intelligent agent, where the request message includes an invitation message or a recommendation message sent to the second intelligent agent; receive a decision message fed back by the second intelligent agent, where the decision message is a message that is determined by the second intelligent agent according to the invitation message or the recommendation message and a knowledge model of the second intelligent agent; and update, according to the decision message, a knowledge model of itself or send a notification message to a first user account corresponding to the intelligent agent.

Further optionally, the processor 701 is specifically configured to: send the request message to the second intelligent agent at any moment; or predict an idle time of a second user account by learning a historical posting time of the second user account, and send the request message to the second intelligent agent at the idle time of the second user account, where the second user account corresponds to the second intelligent agent.

Further optionally, the processor 701 is specifically configured to: determine that an object to which the invitation message or the recommendation message is to be sent is the second intelligent agent; and send the invitation message or the recommendation message to the second intelligent agent.

Further optionally, when determining that the object to which the invitation message or the recommendation message is to be sent is the second intelligent agent, the processor 701 is configured to: obtain, according to a label of itself and a label of another intelligent agent, a measurement value of an interest similarity between a first user corresponding to the first user account and a user corresponding to the another intelligent agent, where the another intelligent agent refers to an intelligent agent that has an association relationship with the first intelligent agent; and determine, according to the measurement value, that the object to which the invitation message or the recommendation message is to be sent is the second intelligent agent.

Further optionally, when determining that the object to which the invitation message or the recommendation message is to be sent is the second intelligent agent, the processor 701 is configured to: determine the invitation message or the recommendation message according to operation information of a user account corresponding to the another intelligent agent; and determine, according to the invitation message or the recommendation message and the label of the another intelligent agent, that the object to which the invitation message or the recommendation message is to be sent is the second intelligent agent.

Further optionally, when the request message is a learning invitation message, the decision message includes related information of the second intelligent agent to be shared with the intelligent agent, or the decision message is refusing to share related information of the second intelligent agent with the intelligent agent, where the related information includes at least any one of the following: a learning model, data, and activity arrangement; and the processor 701 is specifically configured to: learn the related information of the second intelligent agent when the decision message is the related information of the second intelligent agent to be shared with the intelligent agent, and update the knowledge model of itself; or update, when the decision message is refusing to share the related information of the second intelligent agent with the intelligent agent, the knowledge model of itself according to a case in which the second intelligent agent refuses the learning invitation message.

Further optionally, after learning the related information of the second intelligent agent when the decision message is the related information of the second intelligent agent to be shared with the intelligent agent, and updating the knowledge model of itself, the processor 701 is further configured to: obtain a learning outcome by using learned content and by comparing the decision message with the knowledge model of itself; and feed back the learning outcome to the second intelligent agent, so that the second intelligent agent updates the knowledge model of the second intelligent agent according to the learning outcome.

Further optionally, when the request message is an activity invitation message, the decision message includes a message for agreeing to or refusing an activity invitation; and the processor 701 is specifically configured to:

send, when the decision message is the message for agreeing to the activity invitation, the notification message to the first user account corresponding to the first intelligent agent, so that information that the second intelligent agent accepts the activity invitation is displayed on the first user account; or update, when the decision message is the message for refusing the activity invitation, the knowledge model of itself according to a case in which the second intelligent agent refuses the activity invitation message.

Further optionally, when the request message is the recommendation message, the decision message includes accepting or refusing the recommendation message; and the processing unit 701 is specifically configured to: update the knowledge model of itself according to the decision message when the decision message is accepting or refusing the recommendation message.

Further optionally, when sending the request message to the second intelligent agent, the sending unit 701 is specifically configured to send the request message to the second intelligent agent by itself, where before directly sending the request message to the second intelligent agent, the first intelligent agent does not notify the first user account and/or receives no instruction sent by using the terminal device by the first user corresponding to the first user account, where the instruction is used to instruct the first intelligent agent to send the request message to the second intelligent agent.

This embodiment of the present invention provides a terminal device. A processor interacts with a second intelligent agent, so that the terminal device can learn a knowledge model of the second intelligent agent to update a knowledge model of the terminal device; or negotiates with a second intelligent agent, and notifies a user account of a negotiation result; therefore, information on a social network is learned and processed by means of interaction with another intelligent agent, thereby implementing mining of data on the social network.

Figure 8:
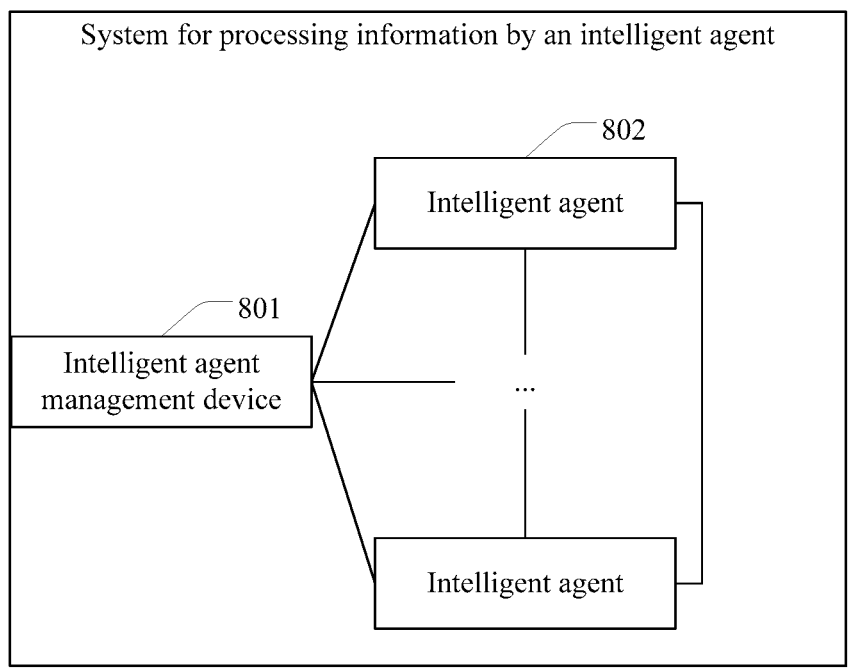
FIG. 8 is a schematic diagram of a system for processing information by an intelligent agent according to an embodiment of the present invention.

An embodiment of the present invention provides a system for processing information by an intelligent agent. As shown in FIG. 8, the system includes an intelligent agent management device 801 and at least one intelligent agent 802.

The intelligent agent 802 is the intelligent agent shown in FIG. 5 or FIG. 6, and details are not repeatedly described herein.

The intelligent agent management device 801 may manage and control the at least one intelligent agent 802, and determine a common rule of all intelligent agents 802 by analyzing behavior patterns of all the intelligent agents 802. A message sent by an intelligent agent 802 is proceeded between the intelligent agents 802 as far as possible, without infringing user privacy and without affecting normal use of an application by a user, and a few messages are ultimately returned to the user, thereby improving user experience of using a social network, and making use of the social network easier and more convenient.

Optionally, the intelligent agent management device 801 may be an independent processor and may communicate with different intelligent agents by using a network.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including an application-specific integrated circuit, a dedicated CPU, a dedicated memory, a dedicated component, and the like. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of the present invention.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly; for related parts, refer to partial descriptions in the method embodiment.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing information, the method comprising:
 performing, by a first intelligent agent in a first terminal device, data mining on a social network, wherein performing the data mining comprises:
  autonomously sending, by the first intelligent agent, a request message to a second intelligent agent in a second terminal device, wherein the request message comprises an invitation message or a recommendation message, wherein:
   each of the first intelligent agent and the second intelligent agent is a virtual machine learning program and corresponds to a respective user account on the social network; and
   the autonomously sending comprises predicting, by the first intelligent agent, an idle time of a second user account by learning a historical activity time of the second user account on the social network, and autonomously sending, by the first intelligent agent, the request message to the second intelligent agent at the idle time of the second user account;
  receiving, by the first intelligent agent, a decision message from the second intelligent agent, wherein the decision message is determined by the second intelligent agent according to a knowledge model of the second intelligent agent and the request message; and
  updating, by the first intelligent agent according to the decision message, a knowledge model of the first intelligent agent or sending, by the first intelligent agent according to the decision message, a notification message to a first user account corresponding to the first intelligent agent.

2. The method according to claim 1, wherein:
 the request message is the recommendation message, and the decision message indicates acceptance or refusal of the recommendation message; and
 updating, by the first intelligent agent according to the decision message, the knowledge model of the first intelligent agent or sending, by the first intelligent agent according to the decision message, the notification message to the first user account corresponding to the first intelligent agent comprises:
  updating, by the first intelligent agent, the knowledge model of the first intelligent agent according to the decision message when the decision message indicates acceptance or refusal of the recommendation message.

3. The method according to claim 1, wherein sending, by the first intelligent agent, the request message to the second intelligent agent comprises:
 sending, directly by the first intelligent agent, the request message to the second intelligent agent, wherein before the first intelligent agent directly sends the request message to the second intelligent agent, the first intelligent agent does not notify the first user account or receives an instruction sent from a terminal device of a first user corresponding to the first user account, wherein the instruction is used to instruct the first intelligent agent to send the request message to the second intelligent agent.

4. An intelligent agent, comprising:
 at least one processor; and
 one or more memories coupled to the at least one processor and storing programming instructions, wherein the programming instructions are for execution by the at least one processor to:
  perform data mining on a social network, wherein performing the data mining comprises:
   autonomously sending a request message to a second intelligent agent, wherein the request message comprises an invitation message or a recommendation message, wherein:
    each of the intelligent agent and the second intelligent agent is a virtual machine learning program and corresponds to a respective user account on the social network; and
    the autonomously sending comprises predicting, by the intelligent agent, an idle time of a second user account by learning a historical activity time of the second user account on the social network, and autonomously sending, by the intelligent agent, the request message to the second intelligent agent at the idle time of the second user account;
   receiving a decision message from the second intelligent agent, wherein the decision message is determined by the second intelligent agent according to the request message and a knowledge model of the second intelligent agent; and
   updating, according to the decision message, a knowledge model of the intelligent agent or send a notification message to a first user account corresponding to the intelligent agent.

5. The intelligent agent according to claim 4, wherein:
the request message is the recommendation message,
the decision message indicates acceptance or refusal of the recommendation message; and
updating the knowledge model or sending the notification message comprises updating the knowledge model according to the decision message when the decision message indicates acceptance or refusal of the recommendation message.

6. The intelligent agent according to claim 4, wherein sending the request message to the second intelligent agent comprises:
directly sending the request message to the second intelligent agent, wherein before directly sending the request message to the second intelligent agent, the intelligent agent does not notify the first user account or receives an instruction from a terminal device of a first user corresponding to the first user account, wherein the instruction is used to instruct the intelligent agent to send the request message to the second intelligent agent.

7. The method according to claim 1, wherein updating the knowledge model of the first intelligent agent comprises:
sending, by the first intelligent agent, computing parameters to a cloud;
receiving, by the first intelligent agent, a computing result from the cloud; and
updating, by the first intelligent agent, the knowledge model of the first intelligent agent based on the computing result.

8. The method according to claim 1, wherein the first terminal device is a smartphone, and the first intelligent agent is a smartphone assistant.

9. The method according to claim 1, wherein the request message is the recommendation message including at least one of a recommended link, a recommended comment, or a recommended picture.

10. The intelligent agent according to claim 4, wherein updating the knowledge model of the intelligent agent comprises:
sending computing parameters to a cloud;
receiving a computing result from the cloud; and
updating the knowledge model of the intelligent agent based on the computing result.

11. The intelligent agent according to claim 4, wherein the intelligent agent is a smartphone assistant in a smartphone.

12. The intelligent agent according to claim 4, wherein the request message is the recommendation message including at least one of a recommended link, a recommended comment, or a recommended picture.

* * * * *